W. I. MILLER.
ELECTRIC LAMP FIXTURE.
APPLICATION FILED JAN. 20, 1912.
1,036,676.
Patented Aug. 27, 1912.
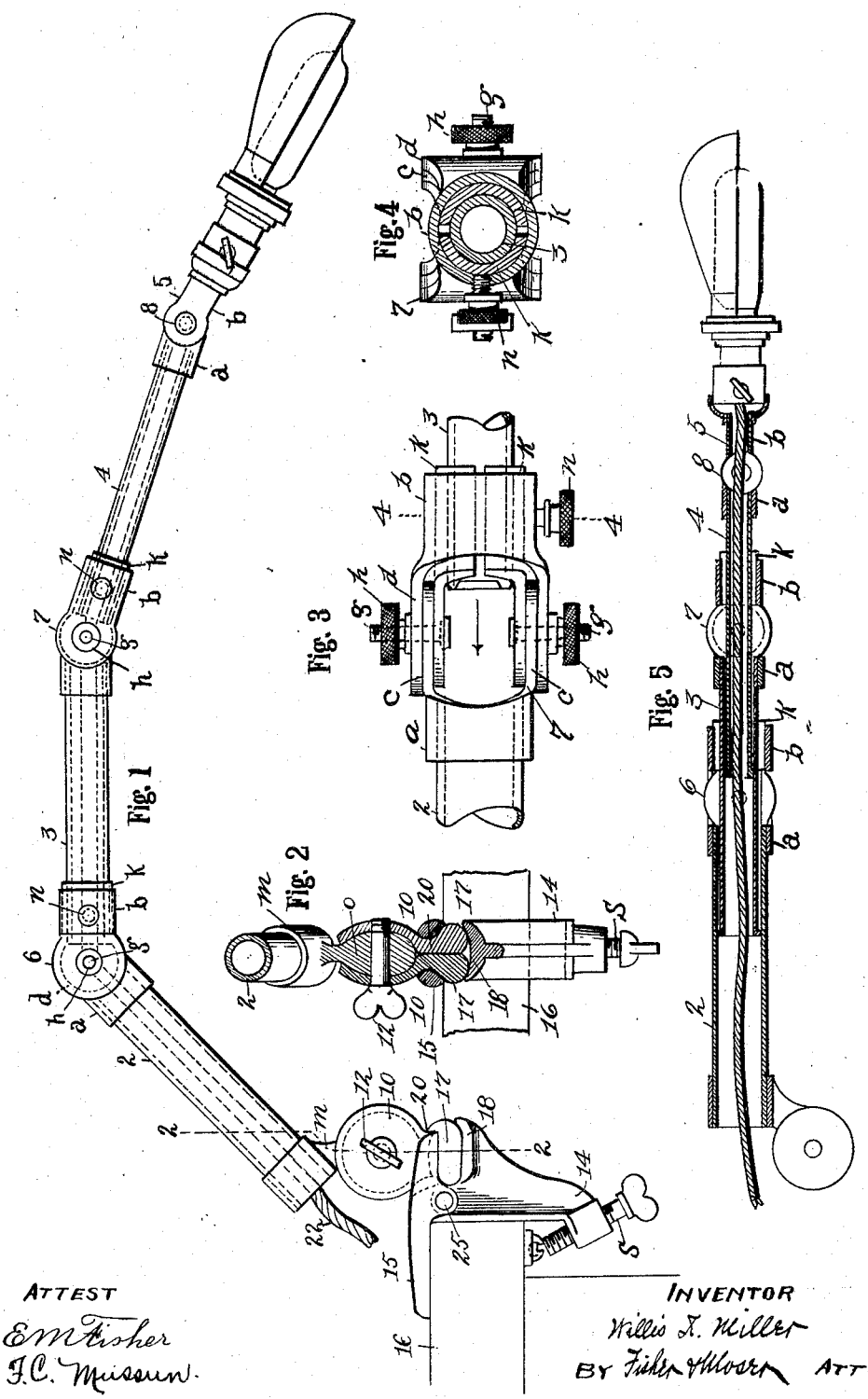
ATTEST
INVENTOR
Willis I. Miller
By Fisher & Moser ATTYS.

UNITED STATES PATENT OFFICE.

WILLIS I. MILLER, OF CLEVELAND, OHIO.

ELECTRIC-LAMP FIXTURE.

1,036,676.  Specification of Letters Patent.  Patented Aug. 27, 1912.

Application filed January 20, 1912. Serial No. 672,438.

*To all whom it may concern:*

Be it known that I, WILLIS I. MILLER, citizen of the United States, residing at Cleveland, in the county of Cuyahoga and State of Ohio, have invented certain new and useful Improvements in Electric-Lamp Fixtures, of which the following is a specification.

My invention relates to electric lamp fixtures, and the invention comprises an improved construction and arrangement of parts, substantially as herein shown and described and particularly pointed out in the claims.

The main object of the invention is to provide an electric-lamp fixture or arm made in sections having pivotal, telescopic and also rotatable relations, whereby the electric lamp or light may be conveniently moved to any point within a circumscribed area from a fixed base of attachment and held where placed.

Other features of the invention involving novelty and utility are embodied in other details of construction, as hereinafter more specifically described.

In the accompanying drawings, Figure 1 is a side elevation of my improved extension lamp holder in its complete embodiment. Fig. 2 is a sectional view on line 2—2, Fig. 1. Fig. 3 is a plan view of one of the jointed portions of the holder but enlarged as compared with Fig. 1. Fig. 4 is a cross section on line 4—4, Fig. 3. Fig. 5 is a sectional view of the fixture or arm with its sections partly telescoped together.

The fixture or arm as thus shown comprises a series of joints or members in jointed relation and adapted to be flexed into various positions and relatively lengthened and shortened according as one position or another of the light is desired, as will now appear. Thus, the said members which in themselves have a fixed length are indicated by 2, 3, 4 and 5 respectively in Figs. 1 and 5, are united by joints 6, 7 and 8 successively from base outward. The several rigid members 2, 3 and 4 are not only tubular but differential in cross section or of gradually diminished cross section successively so as to telescope one into the other when the arm is straightened and for any reason is to be shortened as seen in Fig. 5. The sliding of said members or tubes is through said joints 6, 7 and 8, which are hollow for this reason, and the said joints have each two parts *a* and *b*, as seen for example in Fig. 3, with collar-shaped outer ends or portions in which the said tubular members respectively are supported, and the said parts, *a* and *b*, have flat overlapping sides *c* and *d* and screws *g* with thumbnuts *h* for tightening the joint. The said screws are inserted from the inside and two are used so as to leave a free internal space for telescoping the tubes through said joints as above described. Furthermore, each joint 6 and 7 is provided with a split or two-sided clamping sleeve *k* for the smaller tube at the right of the joint and flat-sided inner extensions clamped against the flat sides *c* by the screws *g*. A set screw *n* through the collar *b* bears against the said sleeve *k*. This is true of both joints 6 and 7, but the said sleeve *k* does not appear in joint 8. With this construction of the said joints the joints themselves can be tightened as closely as may be desired even to rigidity by the screws *g* while the set screws *n* control the tube 3 or 4 for both rotation and elongation or telescoping as described through the joint into the next larger tube. Joint 8 is of the well known kind. The said arm is provided with a single supporting member *m* having a collar in which the tube 2 is fixed and which has a depending oval shaped portion *o* clamped between two jaws 10 by a thumb screw 12 which engages through said jaws and the center of said extension *o*, the said clamp providing for any desired adjustment of the arm as to elevation, while a horizontal adjustment of the arm is obtained through the peculiar clamp and pivot construction involving the bracket 14 and the clamp 15. The said bracket and clamp are pivotally united and the clamp has one end adapted to engage over the top of the table or desk 16 and is bifurcated at its outer end and engaged upon the enlargements or heads 17 on the bottom of the clamping jaws 10. The said bracket has a concave seat 18 in which the said heads 17 are seated, so that when the bracket screw *s* is tightened it will effect the clamping of the bracket upon the table or desk or other support 16 and at the same time lock the clamp 15 down upon the heads 17. The said heads are rounded in the seat and the neck 20 next above the same is rounded also where it is engaged by the said clamp so that a horizontal rotation of the lamp arm is allowed but with such means to tighten the same as the case may require.

A universal jointed arm for the lamp arm is thus afforded with joints here and there in its length for local adjustment. It will be seen also that the foregoing construction provides an arm which is hollow from end to end and adapted to run the electric wire 22 through the same.

It is to be especially observed that the construction and working relation of the said clamp in respect to bracket 14 and the jaws 10 is such that when the single screw *s* is tightened the bracket is firmly fixed on its support and the said jaws are firmly clamped on said bracket, the construction of the combined heads 17 and the socket 18 making practically a ball and socket joint but with separable parts. It will be noticed that the pivot 25 of the said clamping member 15 is between its two ends and between its bearing on 16 and on the enlargements 17 so that there will be a clamping effect on both parts of said member when a downward pull is produced by screw *s*, which is preferably inclined to permit convenient engagement and turning of the screw where room is otherwise limited.

What I claim is:

1. An arm for an electric lamp having a plurality of tubular sections and joints carrying said sections provided with overlapping side portions and separate friction screws binding said sides together, and a two part sleeve in each joint engaged by said screws and about one of said tubes, and a set screw adapted to clamp said sleeve upon said tube.

2. An arm support for an electric lamp having a succession of joints and a support on which it is universally mounted, said support comprising a bracket and a clamping member pivoted between its ends therein and a pair of clamping jaws adapted to be rotarily engaged between said bracket and said clamping member and said jaws rotatably supporting the end of said arm.

3. A flexible fixture for an electric lamp and universal joint supporting means therefor comprising a bracket and a clamp pivoted thereon and adapted to be fixed upon a suitable fixed support, and a pair of jaws supporting said fixture seated upon said bracket and held in working position by said clamp and means to tighten said clamp and bracket and thereby lock said jaws.

4. In supports for electric lamps, an arm having joints and a base member in said arms provided with a bottom extension, in combination with a pair of clamping jaws and a screw through said jaws and member adapted to lock the same together, and the said jaws having portions each of a rounded head, a clamp engaging said head and in respect to which the said parts are horizontally adjustable.

In testimony whereof I affix my signature in presence of two witnesses.

WILLIS I. MILLER.

Witnesses:
F. C. MUSSUN,
E. M. FISHER.

---

Copies of this patent may be obtained for five cents each, by addressing the "Commissioner of Patents, Washington, D. C."